M. B. REED.
PLANTER.
APPLICATION FILED NOV. 20, 1915.
1,260,808.
Patented Mar. 26, 1918.
2 SHEETS—SHEET 1.
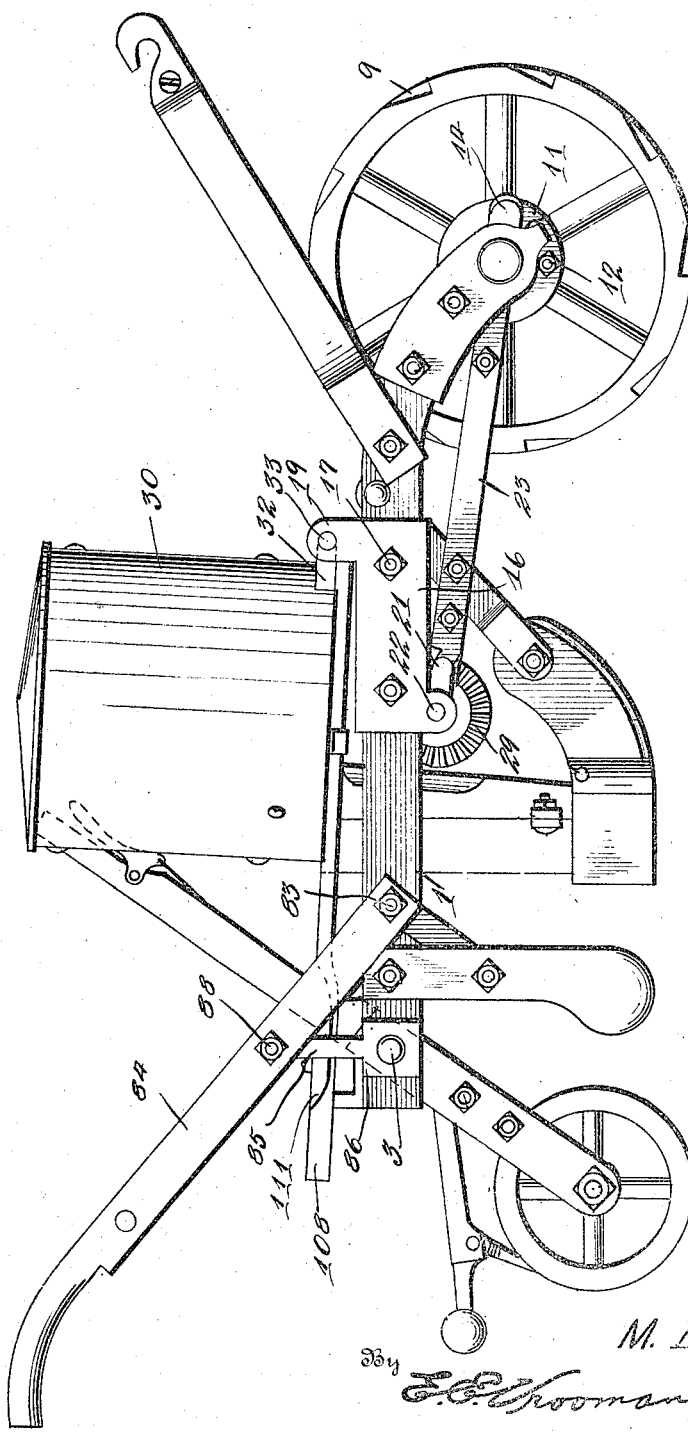
Witnesses
Inventor
M. B. Reed

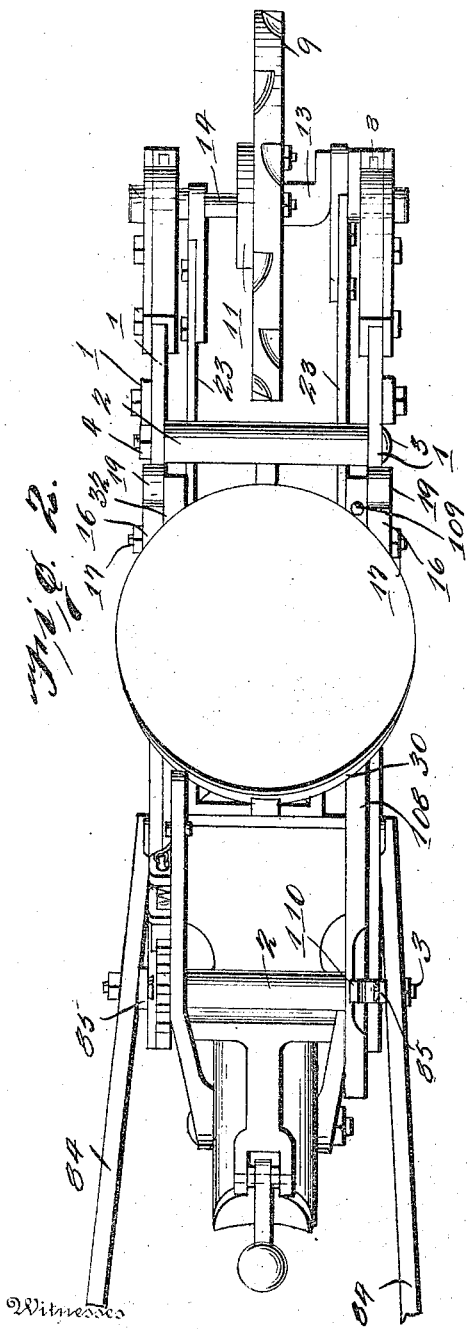
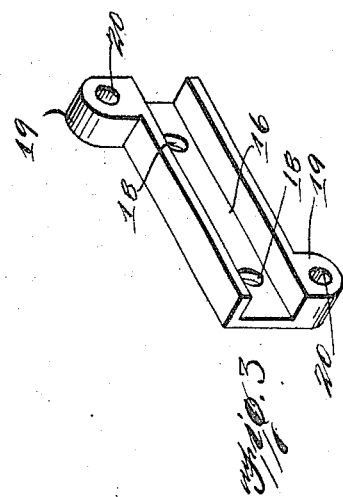

UNITED STATES PATENT OFFICE.

MACK BENJAMIN REED, OF LA FAYETTE, TEXAS.

PLANTER.

1,260,808.

Specification of Letters Patent.  Patented Mar. 26, 1918.

Application filed November 20, 1915. Serial No. 62,564.

*To all whom it may concern:*

Be it known that I, MACK B. REED, a citizen of the United States of America, residing at La Fayette, R. F. D. No. 2, in the county of Camp and State of Texas, have invented certain new and useful Improvements in Planters, of which the following is a specification, reference being had therein to the accompanying drawing.

This invention relates to planters and has for its principal object the provision of a simple and efficient means for retaining the seed hopper of the planter upon the side beams of the same.

Another object of this invention is the production of a planter wherein a plurality of brackets are provided upon the frame of the planter, so as to permit the hopper to be pivotally mounted thereon, whereby when so desired the hopper may be swung for facilitating access to the lower portions thereof, or to the operating mechanism carried by the side beams.

A still further object of this invention is the production of a planter which is provided with simple and efficient means for lifting the same when the hopper is to be swung to an inoperative position.

With these and other objects in view, this invention consists of certain novel combinations, constructions, and arrangements of parts as will be hereinafter fully described and claimed.

In the accompanying drawings:—

Figure 1 is a side elevation of the planter as constructed in accordance with this invention, illustrating the same ready for use.

Fig. 2 is a top plan view of the complete planter.

Fig. 3 is a detailed perspective view of a certain bracket used in connection with this device.

Referring to the accompanying drawings by numerals it will be seen that the planter comprises a pair of side beams 1 which are carried in parallel spaced relation and which are reinforced adjacent their ends by means of the tubes 2 through which the bolts 3 extend so as to carry the nuts 4. In this manner, it will be seen that the side beams 1 will be fixedly retained in spaced relation and will be efficiently braced so as to prevent the same from losing their correct shape.

The forward drive wheel 9 is positioned between the forward ends of the side beams 1. The wheel 9 has a plate 11 secured thereon by means of the bolts or nuts 12 so that the squared portion 13 of the crank shaft 14 may be held in position whereby as the wheel 9 rotates, rotary motion will be imparted to the crank shaft 14, which is carried by the beams 1.

In this manner it will be seen that the crank shaft will be efficiently retained in its correct position and will further, owing to the construction of the plate 11, retain the wheel 9 in a central position between the side beams 1 and 2, although as the wheel rotates, it will positively impart rotary movement to the crank shaft 14.

Upon each beam 1 there is mounted a supporting bracket 16, the construction of which is very clearly shown in Fig. 3. Each supporting bracket 16 is substantially U-shaped in cross section so as to embrace its particular side beam and this supporting bracket 16 is retained in position by means of the nuts and bolts 17, which secure the brackets in position by means of passing through the openings 18 in the bracket and also through the side beams 1. Each bracket is provided with a lug 19 at each end thereof although the lugs extend in opposite directions and are provided with transversely extending openings 20. A second crank shaft 21 has its ends 22 positioned within the openings 20 in the lower lugs 19 of the supporting brackets 16. The pitmen 23 are connected to the crank shafts 14 and 21. The crank shaft 21 is provided with a beveled gear 29 which may be formed integral thereon or keyed thereto, whereby as the drive wheel 9 rotates, the pitmen will be reciprocated by means of the crank shaft 14, thereby imparting rotary motion to the crank shaft 21 and in turn rotating the beveled gear 29.

The hopper 30, used in combination with this invention, is provided with blocks 32 and these blocks 32 are provided with pivot bearings 33 as shown in Figs. 1 and 2. These bearings 33 fit within the remaining openings 20 of the upper lugs 19 of the supporting brackets 16, thereby pivotally mounting the hopper 30 above the side beams 1.

The nuts and bolts 83 pass through the side beams 1 and carry the lower ends of the handles 84. The shanks 85 have bodies 86 secured to the side beams by means of a bolt 3, the upper ends of said shanks being provided with bolts and nuts 88 so as to fixedly retain the handles 84 in their correct set position.

It is of course obvious that any suitable operating mechanism, not being deemed necessary to be herein shown, may be operated by the gear 29 for dispensing seed from the hopper 30.

When so desired, it will be seen that the hopper 30 may be swung upon its journal bearings 33 by means of the lifting bar 108 which is secured thereto by means of the rivet 109. This lifting bar extends rearwardly so as to engage the rack 110 formed upon one of the shanks 85. This lifting bar is provided with a cut away portion 111 so as to facilitate the engagement of the rack 110 and the lifting bar 108 although, when so desired, by lifting the bar 108 and throwing the same forwardly, the hopper 30 may be swung forwardly so as to permit free access to the gear 9, crank shaft 21, pitman 23 or the bottom of the hopper 30.

In order to facilitate the forward movement of the planter, there are provided a pair of strips 112 pivotally secured by means of the bolts or screws 113 to the side beams 1. The forward ends of these strips 112 are secured together by means of a screw or other similar securing means 114 so as to provide a hooked end 115 to which any suitable draft means may be secured. It will be seen by referring particularly to Fig. 1, that these strips 112 bear upon the sectional clamps 5 and therefore will be limited in their downward movement.

What I claim is:—

1. In a planter of the class described, the combination of a pair of side beams, means for supporting said side beams, supporting brackets carried upon said side beams, said brackets being U-shaped in cross section, each bracket provided with a plurality of integral lugs, a hopper pivotally mounted upon a plurality of said lugs, drive means secured to the remaining lugs, a revolving plate positioned within said hopper, said drive means being adapted to rotate said revolving plate whereby the seed may be discharged from said hopper, said hopper being capable of being swung so as to cause said drive means to disengage whereby access may be had to said drive means when it is necessary to clean or repair the same.

2. In a planter of the class described, the combination of a pair of side beams, means for supporting said side beams, supporting brackets carried upon said side beams, each bracket provided with a plurality of integral lugs, a hopper pivotally mounted upon a plurality of said lugs, drive means secured to the remaining lugs, a revolving plate positioned within said hopper, said drive means being adapted to rotate said revolving plate whereby the seed may be discharged from said hopper.

3. In a planter of the class described, the combination of a pair of side beams, means for supporting said side beams, supporting brackets carried upon said side beams, said brackets being U-shaped in cross-section, each bracket provided with a plurality of integral lugs, a hopper pivotally mounted upon a plurality of said lugs, drive means secured to the remaining lugs, a revolving plate positioned within said hopper, said drive means being adapted to rotate said revolving plate whereby the seed may be discharged from said hopper, a lifting bar secured to the lower portions of said hopper and extending rearwardly therefrom, said lifting bar being adapted to facilitate the forward swinging of said hopper whereby said drive means may be disengaged when it is desired to repair or have access to any portion of the planter, and a rack carried upon one of said beams, said bar having a reduced portion, said reduced portion releasably engaging said rack, whereby said hopper will be releasably held in a set position.

In testimony whereof I hereunto affix my signature.

MACK BENJAMIN REED.